United States Patent
Tumanov et al.

(10) Patent No.: US 9,697,500 B2
(45) Date of Patent: Jul. 4, 2017

(54) PRESENTATION OF INFORMATION DESCRIBING USER ACTIVITIES WITH REGARD TO RESOURCES

(75) Inventors: Ilya Tumanov, Redmond, WA (US); George Perantatos, Seattle, WA (US); John Surapunt Wana, Seattle, WA (US); Brian R. Meyers, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 815 days.

(21) Appl. No.: 12/773,319

(22) Filed: May 4, 2010

(65) Prior Publication Data
US 2011/0276925 A1    Nov. 10, 2011

(51) Int. Cl.
*G06F 15/16*    (2006.01)
*G06Q 10/10*    (2012.01)

(52) U.S. Cl.
CPC ......... *G06Q 10/107* (2013.01); *G06Q 10/109* (2013.01)

(58) Field of Classification Search
CPC ......... G06F 17/30572; G06F 17/30699; G06F 17/30713; G06F 17/30716; G06F 17/30719; G06F 17/30722; G06F 17/212; G06Q 10/107; G06Q 10/109; G06Q 30/02; G06Q 30/0204; H04L 67/22
(Continued)

(56) References Cited

U.S. PATENT DOCUMENTS 6,025,841 A    2/2000    Finkelstein et al.
6,241,524 B1    6/2001    Aoshima et al.
(Continued)

FOREIGN PATENT DOCUMENTS

AU    2011248879 B2    10/2014
CN    1941750 A    4/2007
(Continued)

OTHER PUBLICATIONS

International Search Report and Written Opinion cited in International Application No. PCT/US2011/032805 mailed Nov. 28, 2011.
(Continued)

*Primary Examiner* — Phuoc Nguyen
(74) *Attorney, Agent, or Firm* — Merchant & Gould; Steven F. Owens

(57) ABSTRACT

A resource reference is detected in a base resource, such as a web page or an email message. The resource reference refers to a target resource, such as another webpage or another email message. An appropriate activity-based resource type for the resource reference is then identified. The resource reference is then linked to an activity-based resource such that when the base resource is displayed and a user interacts with the resource reference, the activity-based resource is displayed to the user. The activity-based resource comprises a calculated field that has a value that indicates how one or more users have interacted with one or more resources. The value of the calculated field is calculated using activity data indicating how users interacted with the resources. The activity data is generated without receiving input of the activity data from the users.

20 Claims, 9 Drawing Sheets

(58) Field of Classification Search
USPC .............. 709/201, 203, 217, 219, 224, 206
See application file for complete search history.

(56) References Cited

U.S. PATENT DOCUMENTS

| | | | |
|---|---|---|---|
| 6,282,548 B1 | 8/2001 | Burner et al. | |
| 6,340,977 B1 | 1/2002 | Lui | |
| 6,714,929 B1* | 3/2004 | Micaelian et al. | |
| 6,782,414 B1* | 8/2004 | Xue et al. ..................... 709/206 | |
| 7,035,926 B1* | 4/2006 | Cohen ................ G06F 17/3089 | |
| | | 707/E17.116 | |
| 7,225,175 B2 | 5/2007 | Higgins et al. | |
| 7,266,376 B2 | 9/2007 | Nakagawa | |
| 7,346,606 B2 | 3/2008 | Bharat | |
| 7,353,246 B1* | 4/2008 | Rosen ............... G06F 17/30855 | |
| | | 707/999.01 | |
| 7,472,119 B2 | 12/2008 | Dai | |
| 7,493,521 B1 | 2/2009 | Li et al. | |
| 7,716,240 B2 | 5/2010 | Lim | |
| 7,725,530 B2 | 5/2010 | Sah et al. | |
| 7,756,753 B1 | 7/2010 | McFarland | |
| 7,757,170 B2 | 7/2010 | Billsus et al. | |
| 7,827,254 B1 | 11/2010 | Nevill-Manning et al. | |
| 7,962,466 B2 | 6/2011 | Jones et al. | |
| 8,010,527 B2 | 8/2011 | Denoue et al. | |
| 8,160,983 B2 | 4/2012 | Fitzmaurice et al. | |
| 8,229,873 B1 | 7/2012 | Dolan et al. | |
| 8,301,482 B2* | 10/2012 | Reynolds et al. ........... 705/7.29 | |
| 8,468,201 B2 | 6/2013 | Dasilva et al. | |
| 8,606,792 B1 | 12/2013 | Jackson et al. | |
| 8,707,431 B2 | 4/2014 | Stephens et al. | |
| 8,819,009 B2 | 8/2014 | Wana et al. | |
| 8,832,099 B2 | 9/2014 | Howes et al. | |
| 8,979,538 B2 | 3/2015 | Michelstein et al. | |
| 2001/0021914 A1 | 9/2001 | Jacobi et al. | |
| 2002/0007373 A1* | 1/2002 | Blair ................ G06F 17/30011 | |
| | | 715/223 | |
| 2002/0015056 A1 | 2/2002 | Weinlaender | |
| 2002/0099812 A1 | 7/2002 | Davis et al. | |
| 2003/0014331 A1 | 1/2003 | Simons | |
| 2003/0014399 A1 | 1/2003 | Hansen et al. | |
| 2003/0014654 A1 | 1/2003 | Adler et al. | |
| 2003/0061200 A1* | 3/2003 | Hubert .............. G06F 17/30011 | |
| 2003/0197738 A1 | 10/2003 | Beit-Zuri et al. | |
| 2003/0229808 A1 | 12/2003 | Heintz et al. | |
| 2004/0015868 A1 | 1/2004 | Dutta et al. | |
| 2004/0030741 A1* | 2/2004 | Wolton ............. G06F 17/30873 | |
| | | 709/202 | |
| 2004/0034706 A1 | 2/2004 | Cohen et al. | |
| 2004/0210532 A1* | 10/2004 | Nagawa et al. ................ 705/51 | |
| 2004/0230530 A1 | 11/2004 | Searl et al. | |
| 2004/0267701 A1* | 12/2004 | Horvitz ............. G06F 17/30716 | |
| 2005/0033657 A1 | 2/2005 | Herrington et al. | |
| 2005/0097465 A1 | 5/2005 | Giesen et al. | |
| 2005/0154764 A1 | 7/2005 | Riegler et al. | |
| 2005/0165715 A1 | 7/2005 | Farnham et al. | |
| 2005/0203807 A1 | 9/2005 | Bezos et al. | |
| 2005/0222987 A1* | 10/2005 | Vadon ............................... 707/3 | |
| 2006/0004698 A1 | 1/2006 | Pyhalammi | |
| 2006/0004914 A1 | 1/2006 | Kelly et al. | |
| 2006/0015821 A1* | 1/2006 | Jacques Parker ..... G06F 3/0481 | |
| | | 715/800 | |
| 2006/0036950 A1 | 2/2006 | Himberger | |
| 2006/0036964 A1 | 2/2006 | Satterfield | |
| 2006/0036965 A1 | 2/2006 | Harris | |
| 2006/0041562 A1* | 2/2006 | Paczkowski et al. ........... 707/10 | |
| 2006/0064411 A1 | 3/2006 | Gross et al. | |
| 2006/0069617 A1* | 3/2006 | Milener ............ G06F 17/30902 | |
| | | 705/14.69 | |
| 2006/0105302 A1 | 5/2006 | Breiburg et al. | |
| 2006/0127871 A1 | 6/2006 | Grayson | |
| 2006/0143066 A1 | 6/2006 | Calabria | |
| 2006/0200432 A1 | 9/2006 | Flinn et al. | |
| 2006/0247940 A1 | 11/2006 | Zhu et al. | |
| 2006/0277468 A1 | 12/2006 | Sapir | |
| 2006/0294086 A1 | 12/2006 | Rose et al. | |
| 2007/0016553 A1* | 1/2007 | Dumais ............... H04L 12/5885 | |
| 2007/0112768 A1 | 5/2007 | Majumder | |
| 2007/0168909 A1 | 7/2007 | Vaidyanathan et al. | |
| 2007/0233671 A1 | 10/2007 | Oztekin et al. | |
| 2007/0239680 A1 | 10/2007 | Oztekin et al. | |
| 2007/0245020 A1 | 10/2007 | Ott | |
| 2007/0299631 A1 | 12/2007 | Macbeth et al. | |
| 2008/0040474 A1 | 2/2008 | Zuckerberg et al. | |
| 2008/0040673 A1 | 2/2008 | Zuckerberg et al. | |
| 2008/0059516 A1 | 3/2008 | Cui | |
| 2008/0109722 A1 | 5/2008 | Gengler et al. | |
| 2008/0109723 A1 | 5/2008 | Burton et al. | |
| 2008/0140674 A1 | 6/2008 | Ishikawa | |
| 2008/0141168 A1 | 6/2008 | Ryan et al. | |
| 2008/0147424 A1* | 6/2008 | Rowan et al. ..................... 705/1 | |
| 2008/0155471 A1 | 6/2008 | Lynn et al. | |
| 2008/0177623 A1 | 7/2008 | Fritsch et al. | |
| 2008/0189122 A1 | 8/2008 | Coletrane et al. | |
| 2008/0189253 A1 | 8/2008 | Oliver et al. | |
| 2008/0209320 A1 | 8/2008 | Mawhinney et al. | |
| 2008/0235594 A1* | 9/2008 | Bhumkar .......... G06F 17/30991 | |
| | | 715/738 | |
| 2008/0256050 A1 | 10/2008 | Zhang | |
| 2008/0261191 A1 | 10/2008 | Woolf | |
| 2008/0270398 A1 | 10/2008 | Landau et al. | |
| 2008/0276179 A1 | 11/2008 | Borenstein | |
| 2008/0280662 A1 | 11/2008 | Matwin et al. | |
| 2008/0303689 A1* | 12/2008 | Iverson ............... H04L 63/1441 | |
| | | 340/6.1 | |
| 2009/0006371 A1 | 1/2009 | Denoue et al. | |
| 2009/0019039 A1 | 1/2009 | Brindley | |
| 2009/0024712 A1 | 1/2009 | Weiss et al. | |
| 2009/0030927 A1 | 1/2009 | Cases | |
| 2009/0035733 A1 | 2/2009 | Meitar et al. | |
| 2009/0049141 A1 | 2/2009 | Jones et al. | |
| 2009/0055369 A1* | 2/2009 | Phillips ............. G06F 17/30867 | |
| 2009/0055477 A1 | 2/2009 | Flesher et al. | |
| 2009/0070412 A1 | 3/2009 | D'Angelo et al. | |
| 2009/0087820 A1 | 4/2009 | Chandless | |
| 2009/0089380 A1 | 4/2009 | Wang et al. | |
| 2009/0125597 A1 | 5/2009 | Carr et al. | |
| 2009/0126274 A1 | 5/2009 | Vogel et al. | |
| 2009/0150362 A1 | 6/2009 | Evenhaim | |
| 2009/0150507 A1 | 6/2009 | Davis | |
| 2009/0177754 A1 | 7/2009 | Brezina | |
| 2009/0187631 A1* | 7/2009 | Su et al. ........................ 709/206 | |
| 2009/0198562 A1 | 8/2009 | Wiesinger et al. | |
| 2009/0216741 A1 | 8/2009 | Thrall | |
| 2009/0217178 A1 | 8/2009 | Niyogi et al. | |
| 2009/0221371 A1 | 9/2009 | Bakshi | |
| 2009/0248661 A1 | 10/2009 | Bilenko | |
| 2009/0254499 A1 | 10/2009 | Deyo | |
| 2009/0282000 A1* | 11/2009 | Bennett ............. G06F 17/30867 | |
| 2009/0299824 A1* | 12/2009 | Barnes, Jr. .......... G06F 3/04847 | |
| | | 705/7.39 | |
| 2009/0299963 A1 | 12/2009 | Pippuri | |
| 2009/0300716 A1 | 12/2009 | Ahn | |
| 2009/0312033 A1 | 12/2009 | Shen et al. | |
| 2009/0319350 A1 | 12/2009 | Cansler | |
| 2010/0010968 A1 | 1/2010 | Redlich et al. | |
| 2010/0017870 A1 | 1/2010 | Kargupta | |
| 2010/0031162 A1 | 2/2010 | Wiser et al. | |
| 2010/0049852 A1 | 2/2010 | Whitnah et al. | |
| 2010/0058185 A1 | 3/2010 | Commarford | |
| 2010/0082357 A1 | 4/2010 | Follmann et al. | |
| 2010/0095353 A1 | 4/2010 | Athsani et al. | |
| 2010/0125541 A1* | 5/2010 | Wendel ................. G06F 9/4443 | |
| | | 706/47 | |
| 2010/0125562 A1 | 5/2010 | Nair et al. | |
| 2010/0125604 A1 | 5/2010 | Martinez et al. | |
| 2010/0131452 A1 | 5/2010 | Fitzmaurice et al. | |
| 2010/0137049 A1 | 6/2010 | Epstein | |
| 2010/0146118 A1 | 6/2010 | Wie | |
| 2010/0174712 A1 | 7/2010 | Li et al. | |
| 2010/0177938 A1 | 7/2010 | Martinez et al. | |
| 2010/0184495 A1 | 7/2010 | Levy et al. | |
| 2010/0221694 A1 | 9/2010 | Moshenberg | |

(56) References Cited

U.S. PATENT DOCUMENTS

| | | | |
|---|---|---|---|
| 2010/0257179 A1* | 10/2010 | Arrouye | G06F 17/30067 707/741 |
| 2010/0257489 A1 | 10/2010 | Sakanaba | |
| 2010/0263045 A1 | 10/2010 | Dulitz | |
| 2010/0269158 A1 | 10/2010 | Ehler et al. | |
| 2010/0274815 A1 | 10/2010 | Vanasco | |
| 2010/0281035 A1 | 11/2010 | Carmel et al. | |
| 2010/0287213 A1 | 11/2010 | Rolls | |
| 2010/0293190 A1* | 11/2010 | Kaiser et al. | 707/769 |
| 2010/0331064 A1 | 12/2010 | Michelstein et al. | |
| 2010/0331075 A1 | 12/2010 | Michelstein | |
| 2011/0066507 A1 | 3/2011 | Iyer et al. | |
| 2011/0093460 A1 | 4/2011 | Lunt et al. | |
| 2011/0131491 A1 | 6/2011 | Lu et al. | |
| 2011/0173316 A1 | 7/2011 | Moromisato et al. | |
| 2011/0179025 A1 | 7/2011 | Chuang | |
| 2011/0208822 A1 | 8/2011 | Rathod | |
| 2011/0270850 A1 | 11/2011 | Wana et al. | |
| 2011/0271328 A1 | 11/2011 | Sutton-Shearer | |
| 2011/0294564 A1 | 12/2011 | Michelstein et al. | |
| 2011/0294565 A1 | 12/2011 | Michelstein et al. | |
| 2012/0041972 A1 | 2/2012 | Goldberg | |
| 2012/0117470 A1 | 5/2012 | Michelstein et al. | |
| 2012/0191715 A1 | 7/2012 | Ruffner et al. | |
| 2012/0233161 A1 | 9/2012 | Xu et al. | |
| 2012/0233544 A1 | 9/2012 | Roy | |
| 2012/0271831 A1 | 10/2012 | Narayanan et al. | |
| 2012/0290545 A1 | 11/2012 | Tumanov et al. | |
| 2012/0290565 A1 | 11/2012 | Wana et al. | |
| 2012/0290637 A1 | 11/2012 | Perantatos | |
| 2013/0282706 A1 | 10/2013 | Yoo | |

FOREIGN PATENT DOCUMENTS

| | | |
|---|---|---|
| CN | 101079841 A | 11/2007 |
| CN | 1010714963 A | 11/2007 |
| CN | 101095140 A | 12/2007 |
| CN | 101589360 A | 11/2009 |
| CN | 101636737 A | 1/2010 |
| JP | 2006092023 A | 4/2006 |
| JP | 2009151373 A | 7/2009 |
| JP | 2009199226 A | 9/2009 |
| KR | 10-2007-0096198 | 10/2007 |
| WO | 2007056822 A1 | 5/2007 |
| WO | WO 2008/032950 A1 | 3/2008 |
| WO | WO 2008/060032 A1 | 5/2008 |
| WO | WO 2008/133368 A1 | 11/2008 |
| WO | 2009014058 A1 | 1/2009 |
| WO | WO 2009/063469 A2 | 5/2009 |
| WO | WO 2010/048172 A1 | 4/2010 |

OTHER PUBLICATIONS

International Search Report and Written Opinion cited in International Application No. PCT/US2011/031999 mailed Dec. 19, 2011.
Final Office Action mailed Oct. 12, 2012, in co-pending U.S. Appl. No. 12/711,290.
Advisory Action mailed Dec. 27, 2012, in co-pending U.S. Appl. No. 12/771,290.
Bailey et al.; Link Augmentation: A Context-Based Approach to Support Adaptive Hypermedia, published 2001, 8 pages.
Courtenage et al.; Automatic Hyperlink Creation Using P2P and Publish/Subscribe, published Apr. 2005, 8 pages.
Goecks et al.; Automatically Labeling Web Pages Based on Normal User Actions, published 1999, 5 pages.
Li et al.; Combining Usage, Content, and Structure Data to Improve Web Site Recommendation, published 2004, 11 pages.
Office Action mailed May 8, 2012, in co-pending U.S. Appl. No. 12/771,290.
Final Office Action mailed Jul. 9, 2013, in co-pending U.S. Appl. No. 13/106,149.
Courion Access Assurance Suite 8.0 Revolutionizes IAM by Integrating Critical Aspects of Compliance and Risk Mitigation, Feb. 23, 2010: http://www.courion.com/company/press_release.html?id=594.
"My6Sense for iPhone Studies Your Reading Habits, Recommends New Articles Based From It," Jul. 31, 2009: http://www.phoneblog.com/app-reviews/my6sense-for-iphone-studies-your-reading-habits-recommends-new-articles-based-from-it/.
"Ribbon Hero—Boost Your Microsoft Office Skills with this Fun Add-on," Feb. 17, 2010: http://www.makeuseof.com/tag/ribbon-hero-boost-microsoft-office-skills-fun-addon/.
Amazon.com Recommendations: Item-to-item collaborative filtering, Linden, G. Smith, B. and York, J., Jan./Feb. 2003 Internet Computing, IEEE, vol. 7, Issue 1, pp. 76-80, http://ieeexplore.ieee.org/xpls/abs_all.jsp?arnumber=1167344&tag=1.
An Online News Recommender System for Social Networks, Manish Agrawal, Maryam Karimzadehgan, ChengXiang Zhai, 2009, pp. 1-4, http://www.researchgate.net/publication/228576256_An_online_news_recommender_system_for_social_networks.
Anthony Salcito, "Ribbon Hero: Game-Based Learning for Office," Jan. 22, 2010: http://blogs.msdn.com/B/microsoftuseducation/archive/2010/01/22/ribbon-hero-game-based-learning-for-office.aspx.
Basu, Saikat, Ribbon Hero, published Feb. 17, 2010, 11 pages.
Bilenko et al.; Mining the Search Trails of Surfing Crowds: Identifying Relevant Websites from User Activity; Apr. 21-25, 2008; 10 pages.
Divelements, SandRibbon Version History, published Aug. 5, 2009, 4 pages.
Foss Software, Elegant Ribbon—Summary, Foss Software, Copyright 2010, 5 pages.
Gil Taran, "Using Games in Software Engineering Education to Teach Risk Management," 20th Conference on Software Engineering Education & Training (CSEET '07), 2007, 8 pages.
Group-Based Recipe Recommendations: Analysis of Data Aggregation Strategeies, Shlomo Berkovsky and Jill Freyne, Sep. 2010, RecSys2010, pp. 112-118 http://dl.acm.org/citation.cfm?id=1864732.
GroupLens: An Open Architecture for Collaborative Filtering of Netnews, Paul Resnick et al., 2009, pp. 175-186 http://dl.acm.org/citation.cfm?id=192905.
GroupLens: Applying Collaborative Filtering to Usenet News, Joseph A. Konstan et al., Mar. 1997, Communications of the ACM, vol. 40, No. 3, http://dl.acm.org/citation.cfm?id=245126.
He et al., A Social Network-Based Recommender System (SNRS), Doctoral Dissertation, University of California, 2010, 32 pages.
Huajing Li et al., "Personalized Feed Recommendation Service for Social Networks," Aug. 20-22, 2010: http://ieeexplore.ieee.org/stamp/stamp.jsp?arnumber=05590802.
IBM, Defining Help Panel Text, IBM, Copyright 1990, 2008, 6 pages.
Jennifer P. Michelstein, "Play Ribbon Hero and hone your Microsoft Office Skills," Jan. 19, 2010: http://www.officelabs.com/lists/posts/post.aspx?id=88.
Kevin Abo, "Microsoft Office Labs Ribbon Hero," Mar. 5, 2010, http://windowslive.com/connect/post/4e7ac6a8-109e-44c3-b969-196c4lff5sec7.
Louis Gray, "Cascaad Taps Social Graph for Tailored News," Feb. 7, 2010: http://blog.louisgray.com/2010/02/cascaad-taps-social-graph-for-tailored.html.
Mark Arend, "Colleagues, Social Distance & Relevance in People Search; Social Networking Tools," May 1, 2008: http://blogs.msdn.com/b/markarend/archive/2008/05/01/colleagues-social-distance-relevance-in-people-search-social-networking-tools.aspx.
Marc Prensky, "The Motivation of Gameplay or, the REAL 21st century learning revolution," 2002, 14 pages.
Michael Paskevicius, "Introduction to learning and knowledge analytics," Jan. 13, 2011: http://www.bluelightdistrict.org/wp/?p=4534.
Microsoft Office Labs Ribbon Hero, Copyright 2010, 3 pages.
Nagaraju Pappu, "A Knowledge Framework for Enterprise Application Systems Management," Nov. 2007: http://msdn.microsoft.com/en-us/library/bb897546.aspx.

(56) References Cited

OTHER PUBLICATIONS

Paul Marsden, "f-commerce Unleashed: Microsoft, Pandora & Yelp Show the Open Graph Way," May 6, 2010: http://socialcommercetoday.com/f-commerce-unleashed-microsoft-pandora-yelp-show-the-open-graph-way/.
Pushing Pixels, published Apr. 10, 2010, 5 pages.
Radu Rusu et al., "Usage Event Logging in Windows SharePoint Services," Jul. 2004: http://msdn.microsoft.com/en-us/library/dd583134(office.11).aspx.
Ryan Lawler, "Is the Social Graph Good for Video Recommendations?," Dec. 15, 2010: http://gigaom.com/video/clicker-facebook/.
WPF Scrolling Content with Flicks and Gestures, accessed at http://www.therobotgeek.net/articles/WFP_Scrolling_Content.aspx, accessed on Oct. 13, 2010, 5 pages.
Wu Ze-jun et al., "Personalized Recommendation System for E-Commerce Based on Psychological Community," May 16-17, 2009: http://ieeexplore.ieee.org/stamp/stamp.jsp?tp=&arnumber=5173235.
Yoav Artzi et al., "Instance Based Social Network Representation," University of Washington, 2010: http://www.amitlevy.com/papers/community.pdf.
Yoo et al.; Mining Social Networks for Personalized Email Prioritization; Jul. 1, 2009; 9 pages.
Zheng, "Search Commands . . . ," Apr. 28, 2008, 10 pages.
Office Action mailed Jan. 30, 2013, in co-pending U.S. Appl. No. 13/106,149.
Final Office Action mailed Feb. 14, 2013, in co-pending U.S. Appl. No. 13/106,113.
Office Action mailed Aug. 28, 2012, in co-pending U.S. Appl. No. 13/106,113.
Office Action mailed Feb. 13, 2013, in co-pending U.S. Appl. No. 13/106,307.
Office Action mailed Sep. 26, 2012, in co-pending U.S. Appl. No. 13/106,307.
Office Action mailed Mar. 12, 2014, in U.S. Appl. No. 13/106,149, 33 pgs.
Office Action mailed Feb. 26, 2014, in Australian Application No. 2011248879, 3 pgs.
Office Action mailed Mar. 25, 2014, in U.S. Appl. No. 12/943,668, 41 pgs.
Notice of Allowance mailed Apr. 11, 2014 in U.S. Appl. No. 13/106,307, 26 pgs.
Australian Office Action dated May 1, 2014 in Appln No. 2011248879.
Office Action mailed Aug. 1, 2012, in U.S. Appl. No. 12/943,668, 22 pgs.
Final Office Action mailed Oct. 24, 2012, in U.S. Appl. No. 12/943,668, 26 pgs.
Final Office Action mailed Dec. 7, 2012, in U.S. Appl. No. 13/111,192, 21 pgs.
Office Action mailed Dec. 7, 2012, in U.S. Appl. No. 13/111,101, 30 pgs.
Office Action mailed Jan. 3, 2013, in U.S. Appl. No. 12/492,588, 24 pgs.
Office Action mailed Jan. 28, 2013, in U.S. Appl. No. 12/790,472, 33 pgs.
Office Action mailed Mar. 28, 2013, in U.S. Appl. No. 12/943,668, 31 pgs.
Final Office Action mailed May 22, 2013, in U.S. Appl. No. 12/790,472, 32 pgs.
Final Office Action mailed May 22, 2013, in U.S. Appl. No. 12/492,588, 37 pgs.
Final Office Action mailed Jun. 28, 2013, in U.S. Appl. No. 13/111,101, 39 pgs.
Office Action mailed Jul. 2, 2013, in U.S. Appl. No. 13/111,192, 32 pgs.
Final Office Action mailed Aug. 28, 2013, in U.S. Appl. No. 12/943,668, 32 pgs.
Office Action mailed Nov. 29, 2013, in U.S. Appl. No. 13/106,113, 30 pgs.
Office Action mailed Jan. 3, 2014, in U.S. Appl. No. 12/790,472, 41 pgs.
Office Action mailed Jan. 3, 2014, in U.S. Appl. No. 12/492,588, 48 pgs.
Office Action mailed Jul. 17, 2014, in U.S. Appl. No. 12/790,472, 38 pgs.
Office Action mailed Jul. 18, 2014, in U.S. Appl. No. 12/492,588, 42 pgs.
Office Action mailed Jul. 31, 2014, in U.S. Appl. No. 13/106,113, 29 pgs.
Grech, "Publishing on the WWW . . . ", Images Paediatr Cardiol. Oct.-Dec. 2001; 3(4): 55-68.
"Plug-in (computing)", Wikipedia page, retrieved from URL https://web.archive.org/web/20080825210331 /http://en.wikipedia.org/wiki/Plug-in_(computing) on Sep. 14, 2015; Wayback Machinedate of Aug. 25, 2008, 1 pg.
Chinese Third Office Action dated Aug. 28, 2015 in Appln No. 201180022229.X, 6 pgs.
Office Action mailed Sep. 24, 2015, in U.S. Appl. No. 12/771,290, 27 pgs.
Office Action mailed Sep. 25, 2015, in U.S. Appl. No. 13/106,149, 41 pgs.
Office Action mailed Oct. 19, 2015, in U.S. Appl. No. 12/492,588, 41 pgs.
Office Action mailed Nov. 17, 2015, in U.S. Appl. No. 13/106,113, 41 pgs.
Office Action mailed Mar. 17, 2015, in U.S. Appl. No. 13/106,113, 26 pgs.
Office Action mailed Mar. 20, 2015, in U.S. Appl. No. 12/771,290, 31 pgs.
Office Action mailed Apr. 23, 2015, in U.S. Appl. No. 13/111,101, 58 pgs.
Office Action mailed May 11, 2015, in U.S. Appl. No. 12/492,588, 31 pgs.
Office Action mailed May 15, 2015, in U.S. Appl. No. 13/111,192, 25 pgs.
Chinese Office Action dated Apr. 14, 2015 in Appln No. 201180022229.X, 13 pgs.
Japanese Office Action dated Mar. 25, 2015 in Appln No. 2013-507984, 6 pgs.
Chinese Second Office Action dated Jun. 18, 2015 in Appln No. 201180021588.3, 10 pgs.
Notice of Acceptance dated Sep. 18, 2014 in Appln No. 2011248879, 2 pgs.
Chinese Office Action dated Nov. 4, 2014 in Appln No. 201180002158.3, 13 pgs.
Office Action mailed Sep. 11, 2014, in U.S. Appl. No. 12/771,290, 39 pgs.
Office Action mailed Sep. 12, 2014, in U.S. Appl. No. 13/111,101, 70 pgs.
Office Action mailed Sep. 18, 2014, in U.S. Appl. No. 13/111,192, 49 pgs.
Office Action mailed Oct. 10, 2014, in U.S. Appl. No. 12/492,588, 44 pgs.
Office Action mailed Nov. 19, 2014, in U.S. Appl. No. 12/943,668, 53 pgs.
Office Action mailed Dec. 15, 2014, in U.S. Appl. No. 13/106,149, 52 pgs.
Notice of Allowance mailed Oct. 24, 2014 in U.S. Appl. No. 12/790,472, 23 pgs.
Corrected Notice of Allowance mailed Dec. 12, 2014 in U.S. Appl. No. 12/790,472, 7 pgs.
Chinese Office Action dated Oct. 30, 2014 in Appln No. 201180022229.X, 17 pgs.
Chinese Fourth Office Action dated Jun. 29, 2016 in Appln No. 201180021588.3, 10 pages.
Chinese Notice of Grant dated Feb. 5, 2016 in Appln No. 201180022229.X, 4 pgs.
European Office Action in application 11777815.9 , mailed Mar. 29, 2016, 1 pg.
European Search Report Issued in Patent Application No. 11777815.9, Mailed Date: Mar. 8, 2016, 06 Pages.

(56) References Cited

OTHER PUBLICATIONS

Japanese Office Action dated Feb. 3, 2016 in Application No. 2013-507984, 2 Pages.
Chinese Third Office Action dated Dec. 16, 2015 in Appln No. 201180021588.3, 10 pgs.
U.S. Appl. No. 13/106,149, Office Action mailed Jul. 18, 2016, 42 pages.
U.S. Appl. No. 13/106,113, Notice of Allowance mailed Jul. 5, 2016, 39 pages.
U.S. Appl. No. 13/106,149, Office Action mailed Mar. 27, 2017, 44 pages.

* cited by examiner

PRESENTATION OF INFORMATION DESCRIBING USER ACTIVITIES WITH REGARD TO RESOURCES

BACKGROUND

In today's workplace, people frequently create resources on which other people perform various activities. For example, one person could create a web page and another person could download the web page, print the web page, copy information out of the web page, or perform other types of activity with regard to the web page. In another example, one person could send an email message to another user. In this example, the other user can then read the email message, reply to the email message, forward the email message, or perform some other type of activity with regard to the email message.

In many circumstances, it would be helpful to know what activities people performed with regard to resources and who performed the activities. For example, a user sends out an important email message to a group of colleagues. In this example, it would be helpful for the user to know which of the user's colleagues have read the email message. In another example, a person has asked his supervisor to review a document. In this example, it would be helpful for the user to know whether the supervisor has looked at the document yet.

SUMMARY

To help users know what activities other people have performed with regard to resources, resource references are detected in the resources. The resource references refer to target resources, such as other web pages or other email messages. Appropriate activity-based resource types for the resource references are then identified. The resource references are then linked to activity-based resources such that when the base resources are displayed and users interact with the resource references, the activity-based resources are displayed to the users. The activity-based resources comprise calculated fields that have values that indicate how one or more users have interacted with one or more resources. The values of the calculated fields are calculated using activity data indicating how users interacted with the resources. The activity data are generated without receiving input of the activity data from the users.

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

DETAILED DESCRIPTION

Figure 1:
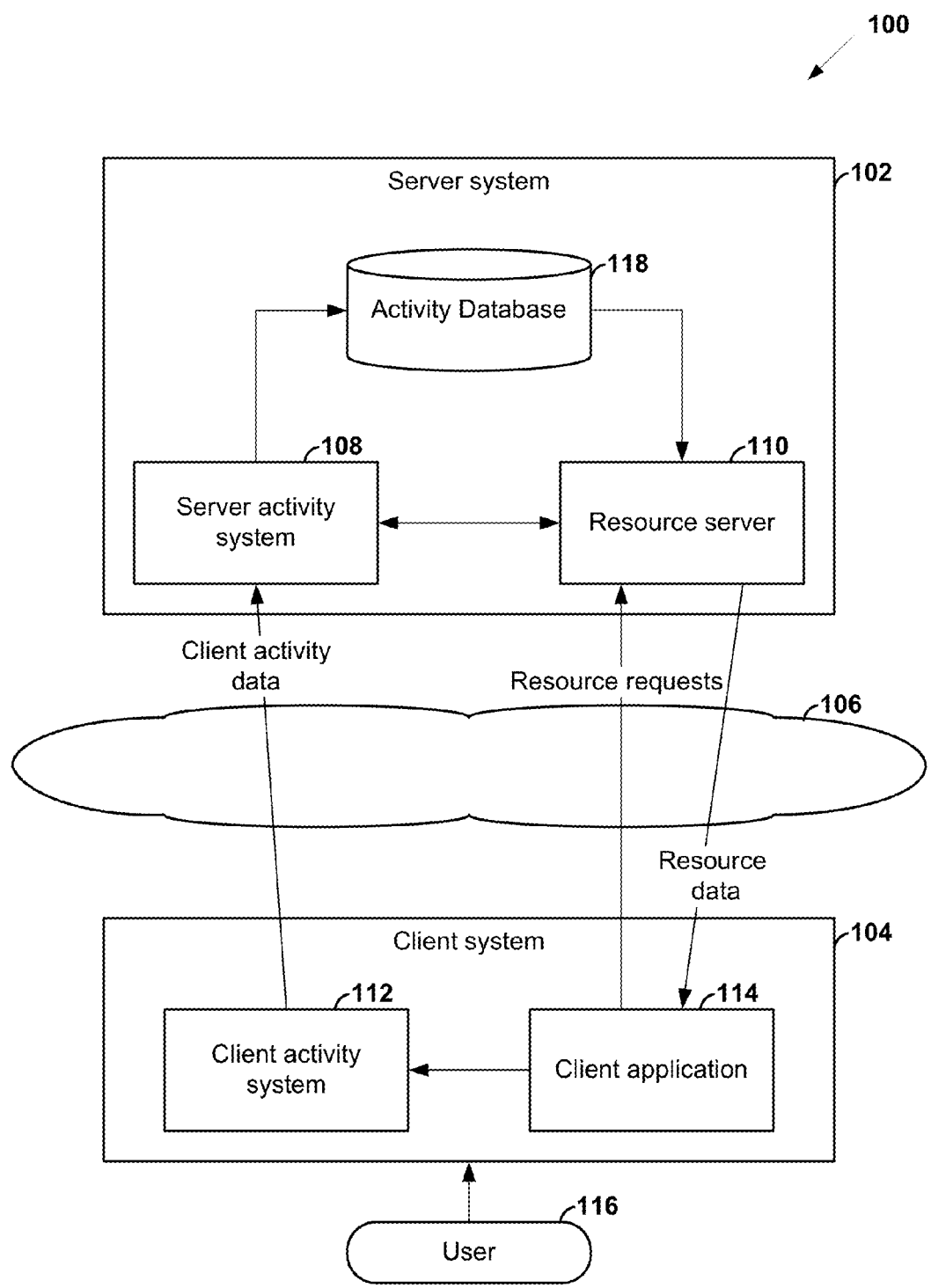
FIG. 1 is a block diagram illustrating an example system.

FIG. 1 is a block diagram illustrating an example system 100. The system 100 comprises a server system 102, a client system 104, and a network 106. It should be appreciated that the system 100 can contain components in addition to those illustrated in the example of FIG. 1. Such additional components are omitted from FIG. 1 for the sake of clarity.

The server system 102 is a system comprising one or more computing devices. As used herein, a computing device is a physical, tangible device that processes information. In various embodiments, the server system 102 comprises various types of computing devices. For example, the server system 102 can comprise one or more desktop computers, laptop computers, netbook computers, handheld computing devices, smartphones, standalone server devices, blade server devices, mainframe computers, supercomputers, and/or other types of computing devices. In embodiments where the server system 102 comprises more than one computing device, the computing devices in the server system 102 can be distributed across various locations and communicate via a communications network, such as the Internet or a local area network.

The client system 104 is also a system comprising one or more computing devices. In various embodiments, the client system 104 comprises various types of computing devices. For example, the client system 104 can comprise any of the types of computing devices listed above with regard to the server system 102.

The network 106 is a communications network that comprises a collection of computing devices and links that facilitate communication among the server system 102 and the client system 104. In various embodiments, the network 106 includes various types of computing devices. For example, the network 106 can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices. In various embodiments, the network 106 includes various types of links. For example, the network 106 can include wired and/or wireless links. Furthermore, in various embodiments, the network 106 is implemented at various scales. For example, the network 106 can be implemented as one or more local area networks (LANs), metropolitan area networks, subnets, wide area networks (such as the Internet), or can be implemented at another scale.

One or more data storage systems in the server system 102 store computer-readable instructions that, when executed by one or more processing units in the server system 102, cause the server system 102 to provide a server activity system 108 and a resource server 110. In addition, one or more data storage systems in the server system 102 store an activity database 118. A data storage system is a system comprising one or more computer-readable data storage media. A computer-readable data storage medium is a physical device or article of manufacture that is capable of storing data in a volatile or non-volatile way. In some embodiments, the data storage system comprises one or more computer-readable data storage media that are non-transient. Example types of computer-readable data storage media include random access memory (RAM), read-only memory (ROM), optical discs (e.g., CD-ROMs, DVDs, BluRay discs, HDDVD discs, etc.), magnetic disks (e.g., hard disk drives, floppy disks, etc.), solid state memory devices (e.g., flash memory drives), EEPROMS, field programmable gate arrays, and so on.

In some embodiments where the one or more data storage systems in the server system 102 comprise more than one computer-readable data storage medium, the computer-readable data storage media are distributed across various geographical locations. In some embodiments where the data storage system in the server system 102 comprises more than one computer-readable data storage medium, the computer-readable instructions associated with the server activity system 108 and the resource server 110 can be distributed across two or more of the computer-readable data storage media. Likewise, in some embodiments where the data storage system in the server system 102 comprises more than one computer-readable data storage medium, the activity database 118 can be distributed across two or more of the computer-readable data storage media. It should be appreciated that in other embodiments, the server system 102 provides more or fewer components than are illustrated in the example of FIG. 1. Moreover, it should be appreciated that FIG. 1 shows the server system 102 in a simplified form for ease of comprehension.

The activity database 118 is a database that stores activity data. In various embodiments, the activity database 118 is implemented in various ways. For example, in some embodiments, the activity database 118 is implemented as relational database. In other embodiments, the activity database 118 is implemented as one or more flat files. In yet other embodiments, the activity database 118 is implemented as a directory.

One or more data storage systems in the client system 104 store computer-readable instructions that, when executed by one or more processing units in the client system 104, cause the client system 104 to provide a client activity system 112 and a client application 114. In some embodiments where the data storage system in the client system 104 comprises more than one computer-readable data storage medium, the computer-readable instructions associated with the client activity system 112 and the client application 114 are distributed across two or more of the computer-readable data storage media. In other embodiments where the data storage system in the client system 104 comprises more than one computer-readable data storage medium, the computer-readable instructions associated with the client activity system 112 and the client application 114 are stored on only one of the computer-readable data storage media. It should be appreciated that in other embodiments, the client system 104 includes more or fewer components than are illustrated in the example of FIG. 1. Moreover, it should be appreciated that FIG. 1 shows the client system 104 in a simplified form for ease of comprehension.

In various embodiments, the client application 114 can be various types of applications. For example, the client application 114 can be a web browser application, such as the MICROSOFT INTERNET EXPLORER® web browser, the GOOGLE CHROME web browser, or the MOZILLA FIREFOX web browser. In other embodiments, the client application 114 can be an email client, such as the MICROSOFT® OUTLOOK® email client. In yet other embodiments, the client application 114 can be other types of applications, such as word processing applications, spreadsheet applications, database applications, document management service clients, and other types of client applications.

A user 116 uses the client application 114 provided by the client system 104 to access resources. In some embodiments, the resources are hosted by the resource server 110 provided by the server system 102. In various embodiments, the resource server 110 can be various types of servers. For example in some embodiments, the resource server 110 can be a MICROSOFT® SHAREPOINT server, a MICROSOFT® Internet Information Services server, or another type of server.

As used in this document, a resource is an identifiable thing. Example types of resources include, but are not limited to, static or dynamically-generated web pages, word processor documents, spreadsheet documents, databases, database entries, email messages, electronic calendar appointments, electronic task list tasks, PDF documents, video files and streams, audio files and streams, activity-based resources, people, places, buildings, and other types of identifiable things.

To request resources hosted by the resource server 110, the client application 114 sends resource requests to the resource server 110 via the network 106. In response to resource requests from the client application 114, the resource server 110 sends resource data to the client application 114 via the network 106. The resource data represents the requested resources. In some instances, the resource server 110 dynamically generates the resource data. In other words, the resource server 110 creates the resource data representing a resource in response to receiving a resource request for the resource. The client application 114 processes the resource data received from the resource server 110 to present the requested resources to the user 116.

The client activity system 112 generates client activity data. The client activity data indicates how the user 116 interacted with resources. For example, the client activity system 112 can generate client activity data indicating a length of time a window containing a resource was in the foreground of a user interface displayed to the user 116, a length of time that the user 116 actively provided mouse and/or keyboard input with regard to a resource in a window, how many times the user 116 brought a window containing a resource into the foreground of a user interface displayed to the user 116, how many times the user 116 printed a resource, how many times the user 116 copied and pasted information out of a resource, whether the user 116 edited a resource, whether the user 116 forwarded a resource to another user, and other types of user activities detectable from the client system 104. Furthermore, in some embodiments, the client activity data can indicate the occurrence of various combinations of interactions between the user 116 and the resource. For example, the client activity system 112 can generate client activity data indicating that the user 116 reviewed a document when the client activity system 112 detects that the user 116 opened the document, scrolled through the document, and added comments to the document.

The client activity system 112 generates the client activity data automatically. In other words, the client activity system 112 generates the client activity data without receiving input of the client activity data from the user 116. For instance, the user 116 does not need to instruct the client activity system 112 to generate individual pieces of data regarding how the user 116 interacted with individual resources.

The client activity system 112 sends client activity data to the server activity system 108 via the network 106. When the server activity system 108 receives the client activity data from the client activity system 112, the server activity system 108 adds the client activity data to activity data stored in the activity database 118. When the server activity system 108 adds the client activity data to the activity data stored in the activity database 118, at least some of the client activity data remains associated with the user 116. In other words, the server activity system 108 stores at least some of the client activity data such that it is possible to determine how the user 116, as an individual, interacted with various resources. That is, at least some of the client activity data is not aggregated with the activity data relating to other users or made anonymous.

The server activity system 108 also receives client activity data indicating how other users in a population interacted with resources hosted by the resource server 110. The population includes the user 116. In various embodiments, the population is defined in various ways. For example, the server activity system 108 can receive client activity data from client activity systems installed at client systems used by some or all employees in an enterprise. In another example, the server activity system 108 can receive client activity data from client activity systems installed at client systems used by people who have registered for a service or otherwise voluntarily joined the community. Like the client activity data relating to the user 116, the server activity system 108 adds the client activity data relating to other users to the activity data in the activity database 118. When the server activity system 108 adds the client activity data to the activity data stored in the activity database 118, at least some of the client activity data relating to the other users remains associated with the other users. In other words, at least some of the client activity data relating to the other users is not aggregated or made anonymous.

Furthermore, in some embodiments, the server activity system 108 also generates server activity data. The server activity data indicates how users interacted with resources hosted by the resource server 110. For example, the server activity system 108 can generate server activity data indicating how many times the user 116 requested a resource, whether the user 116 modified the resource, whether the user 116 performed another search after receiving a search result page containing the resource, or performed other types of activities detectable from the server system 102. The server activity system 108 adds the server activity data to the activity data in the activity database 118. When the server activity system 108 adds server activity data related to a user to the activity database 118, at least some of the server activity data remains associated with the user. For this reason, the server activity data can be used to later determine how the user interacted with various resources.

It should be appreciated that in some embodiments, the client system 104 does not include the client activity system 112. In such embodiments, the server activity system 108 generates all of the activity data stored in the activity database 118 without receiving activity data from client systems.

An activity-based resource is a resource that displays information about how one or more users have interacted with one or more resources. The information about how one or more users have interacted with one or more resources is generated using the activity data in the activity database. As described in detail elsewhere in this document, activity-based resources can display a wide variety of different types of information about how users interacted with resources. For example, an activity-based resource can display a list of the users who have printed another resource and a list of users who have copied and pasted information out of the resource. In another example, an activity-based resource can display personal information about a user and a list of documents that the user has edited in the last week. In yet another example, an activity-based resource can display information about which users have read a particular email message. In some embodiments, activity-based resources can display data that is aggregated from client or server activity data. Furthermore, in some embodiments, activity-based resources can display anonymous information based on client or server activity data.

A resource reference is data that refers to another resource. A target resource is the resource to which a resource reference refers. Various embodiments support various types of resource references. For example, in some embodiments, a hyperlink is a supported type of resource reference. In another example, in some embodiments, a graphical user interface element (e.g., an icon or control) that refers to another resource is a supported type of resource reference. In yet another example, in some embodiments, text or images that refer to other resources are supported types of resource references. A resource reference can refer to a variety of different types of target references. Example types of target references include web pages, word processor documents, spreadsheet documents, databases, personal contact information, task items, calendar appointments, drawing documents, notes documents, users, and other types of resources. Furthermore, in some embodiments, a base resource can contain a resource reference that refers to the base resource.

One or more components of the system 100 operate to detect resource references in base resources. A base resource is any type of resource that can be displayed to a user. Upon detecting a resource reference in a base resource, the component identifies an appropriate resource type for the resource reference. The component identifies the appropriate resource type based at least in part on a type of the base resource and a type of the target resource of the resource reference. After identifying the appropriate activity-based resource type for the resource reference, the component automatically links the resource reference to an activity-based resource that belongs to the appropriate activity-based resource type.

As a result of linking a resource reference in a base resource to an activity-based resource, the client application 114 can display the activity-based resource to the user 116. In some embodiments, the client application 114 displays the activity-based resource to the user 116 automatically. For example, in such embodiments, the client application 114 can display the activity-based resource to the user 116 as a semi-transparent popup region. In other embodiments, the client application 114 displays the activity-based resource to the user 116 in response to an action performed by the user 116 with regard to the resource reference. For example, the client application 114 displays the activity-based resource like a tool tip. In other words, in this example, the client application 114 displays the activity-based resource when the user 116 positions a cursor over the resource reference for a certain period of time and hides the activity-based resource when the user 116 moves the cursor off the resource reference. In another example, the client application 114 displays the activity-based resource when the user 116 positions a cursor over the resource reference for a certain period of time, but does not hide the activity-based resource when the user 116 moves the cursor off the resource reference. In this example, the user 116 can use the cursor to select data in the activity-based resource. In yet another example, the client application 114 can display the activity-based resource when the user clicks on the resource reference. In yet another example, the client application 114 can display the activity-based resource when the user enters a keystroke combination while the resource reference is selected. In yet another example, the client application 114 can display the activity-based resource when the user speaks a voice command. Furthermore, in some embodiments, the client application 114 displays the target resource when the user 116 selects the resource reference.

In some embodiments, a resource reference has a different appearance when an activity-based resource is associated with the resource reference. For example, a resource reference can have one color when no activity-based resource is associated with the resource reference and has another color when an activity-based resource is associated with the resource reference.

As described elsewhere in this document, various components of the system 100 can operate to automatically link resource references in base resources to activity-based resources. For example, in some embodiments, the resource server 110 operates to automatically link resource references in base resources to activity-based resources. In other embodiments, the client application 114 operates to automatically link resource references in base resources to activity-based resources.

Figure 2:
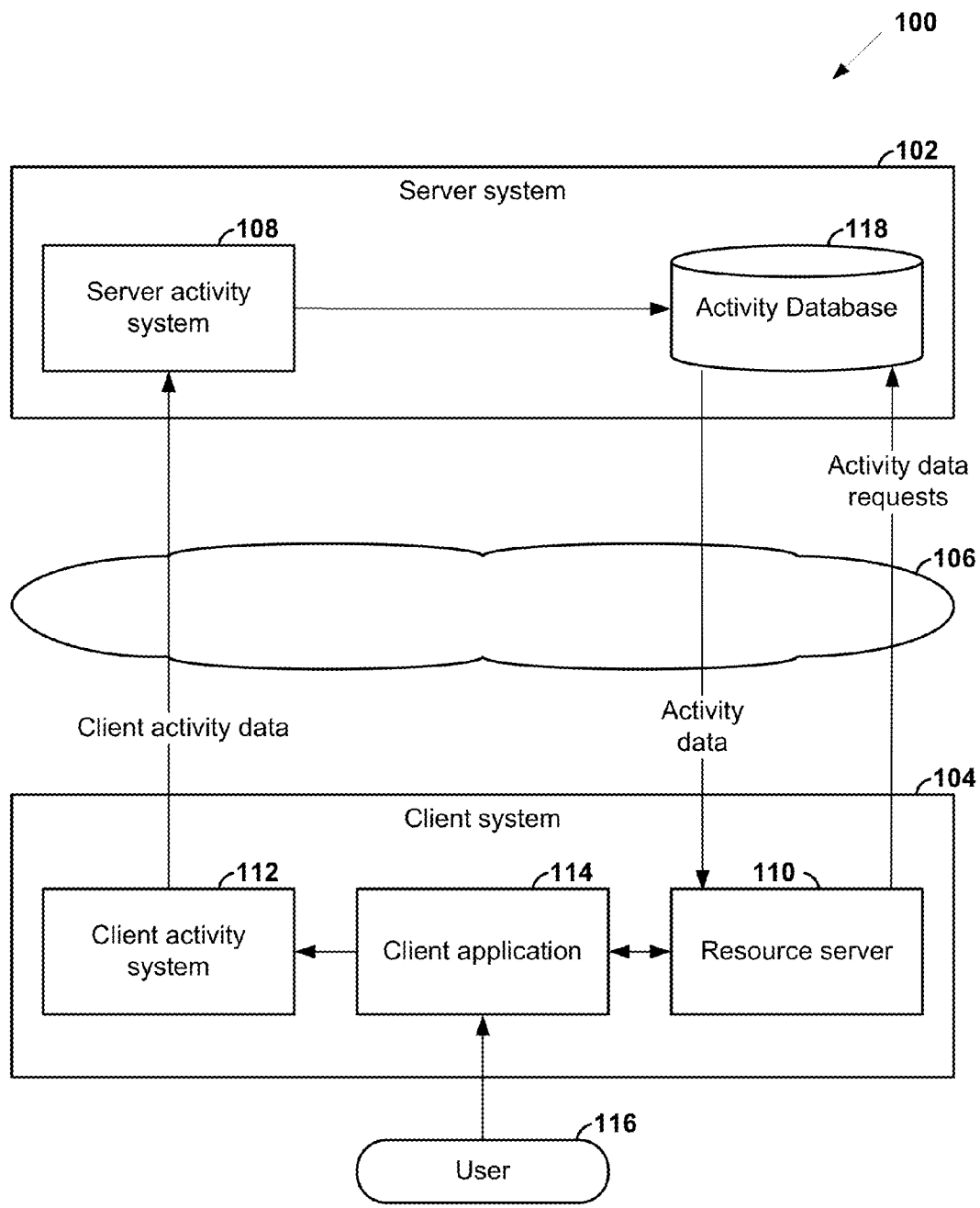
FIG. 2 is a block diagram illustrating an example alternate system.

FIG. 2 is a block diagram illustrating an alternate embodiment of the system 100. As illustrated in the example of FIG. 2, the server system 102 comprises the server activity system 108 and the activity database 118 as described with regard to the example of FIG. 1. Furthermore, in the example of FIG. 2, the client system 104 comprises the client activity system 112 and the client application 114 as described with regard to the example of FIG. 1.

In addition, one or more data storage systems at the client system 104 store computer-readable instructions representing the resource server 110. The computer-readable instructions, when executed by one or more processing units in the client system 104, cause the client system 104 to provide the resource server 110. In some embodiments, the resource server 110 is part of the client application 114.

The resource server 110 operates much like the resource server 110 described with regard to the example of FIG. 1. The client application 114 is able to send resource requests to the resource server 110. In response to the resource requests, the resource server 110 sends resource data representing the requested resources to the client application 114. To retrieve relevant activity data when generating resource data representing activity-based resources, the resource server 110 sends queries to the activity database 118 via the network 106. In response to the queries, the activity database 118 sends the relevant activity data to the resource server 110 via the network 106. The resource server 110 then generates resource data representing activity-based resources using the relevant activity data.

Figure 3:
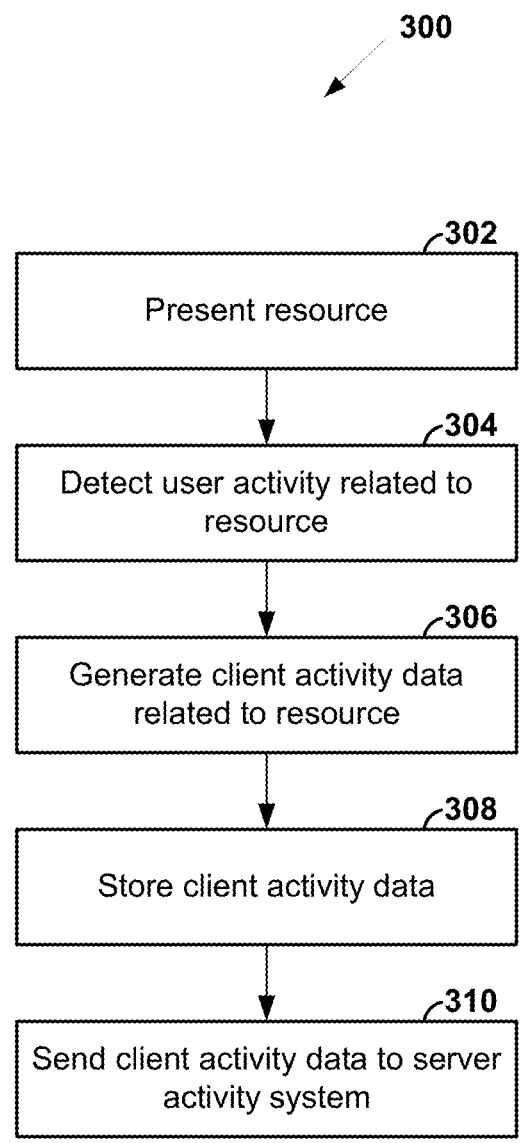
FIG. 3 is a flowchart illustrating an example operation performed by a client system.

FIG. 3 is a flowchart illustrating an example operation 300 performed by the client system 104. Although the operation 300 is described with reference to the client system 104, it should be appreciated that multiple client systems can perform the operation 300 in order to retrieve resources from the server system 102 and send activity data to the server system 102.

As illustrated in the example of FIG. 3, the operation 300 begins when the client application 114 presents a resource to the user 116 (302). In various embodiments, the client application 114 presents various types of resources to the user 116. For example, the client application 114 can present web pages, word processor documents, spreadsheet documents, email messages, task items, video streams, calendar appointments, audio files, graphical user interfaces, and other types of resources to the user 116. In some embodiments, the resource can be dynamically generated.

In some embodiments, the resource is hosted by the resource server 110. In such embodiments, the client application 114 can send a resource request to the resource server 110. The resource request requests the resource. In other embodiments, the resource is stored or dynamically generated at the client system 104.

After the client application 114 presents at least some of the resource, the client activity system 112 detects user activity related to the resource (304). For example, the client activity system 112 can detect input from the user 116 to bring a window containing the resource into the foreground of a user interface. In another example, the client activity system 112 can detect input from the user 116 to copy data out of the resource. In yet another example, where the resource is an email message, the client activity system 112 can detect input from the user 116 to forward or reply to the email message.

When the client activity system 112 detects user activity related to the resource, the client activity system 112 generates client activity data related to the resource (306). The client activity data indicates how the user 116 interacted with the resource. As the user 116 continues to interact with the resource, the client activity system 112 continues to generate client activity data related to the resource.

When the client activity system 112 generates client activity data, the client activity system 112 stores the client activity data (308). In various embodiments, the client activity system 112 stores the client activity data in various ways. For example, in some embodiments, the client activity system 112 stores the client activity data in a relational database. In other embodiments, the client activity system 112 stores the client activity data in a log file.

Subsequently, the client activity system 112 sends the client activity data to the server activity system 108 (310). In various embodiments, the client activity system 112 sends the client activity data to the server activity system 108 in various ways. For example, in some embodiments, the client activity system 112 generates client activity data indicating user activities occurring over a given time period and then sends the client activity data to the server activity system 108 in bulk. For instance, the client activity system 112 can generate client activity data indicating user activity occurring over a day, an hour, a week, or another time period before sending the client activity data to the server activity system 108. In other embodiments, the client activity system 112 sends client activity data to the server activity system 108 on a continuous basis as the client activity system 112 generates the client activity data.

Figure 4:
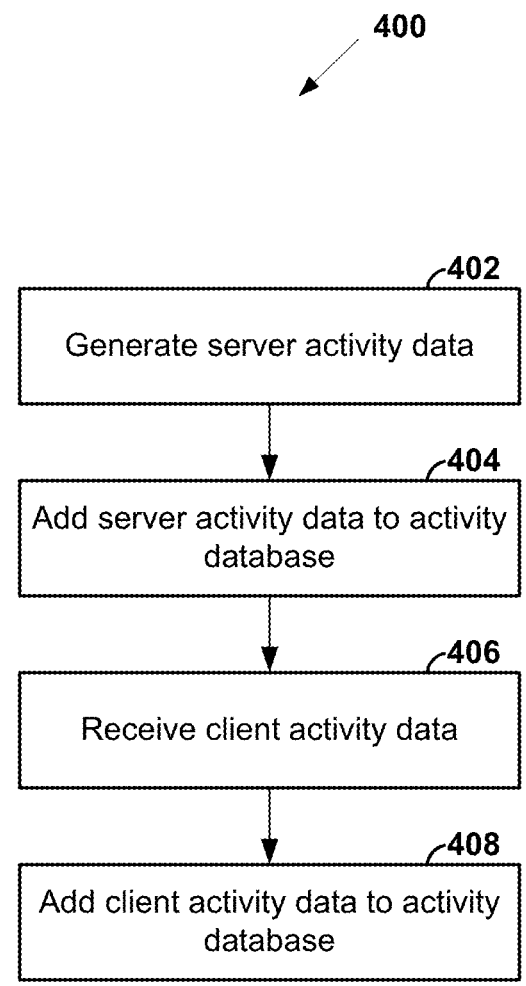
FIG. 4 is a flowchart illustrating an example operation performed by a server system.

FIG. 4 is a flowchart illustrating an example operation 400 performed by the server activity system 108. Although the operation 400 is described with regard to the server activity system 108 interacting with the client system 104 and the user 116, it should be appreciated that the server activity system 108 and other user can interact in the same or similar ways with other participating client systems and users. For example, the server activity system 108 can interact with some or all client systems in an enterprise in the same way as the client system 104.

As illustrated in the example of FIG. 4, the server activity system 108 generates server activity data (402). The server activity data indicates how the user 116 interacts with the various resources. In various embodiments, the server activity system 108 generates various types of server activity data. For example, the server activity system 108 can initially generate server activity data indicating that the user 116 requested a given resource hosted by the resource server 110. In another example, the server activity system 108 can generate server activity data indicating that the user 116 updated a resource, such as a user profile page, hosted by the resource server 110. In yet another example, the server activity system 108 can generate server activity data indicating that the user 116 used a micro-blogging service provided by the resource server 110 to send messages to users who follow the user 116.

Furthermore, in various embodiments, the server activity system 108 can generate the server activity data in various ways. For example, in some embodiments, the server activity system 108 uses log files generated by the resource server 110 to generate the server activity data. In other embodiments, the server activity system 108 uses data provided to the server activity system 108 by the resource server 110 or other servers.

The server activity system 108 adds the server activity data to the activity database 118 (404). The server activity system 108 stores the server activity data in the activity database 118 such that at least some of the server activity data remains associated with the user 116. In other words, the server activity system 108 does not make all of the server activity data anonymous.

The server activity system 108 also receives client activity data from the client activity system 112 (406). The client activity data indicates how the user 116 interacted with one or more resources. In various embodiments, the client activity data is formatted in various ways. For example, in some embodiments, the client activity data is formatted as one or more HTTP requests, as one or more WEBDAV requests, as one or more RPC requests, as one or more SOAP over HTTP requests, and so on.

Furthermore, in various embodiments, the server activity system 108 can receive client activity data related to various types of resources with which the users interacted. For example, the server activity system 108 can receive client activity data indicating how users interacted with resources hosted by the resource server 110 and/or resources hosted by servers other than the resource server 110. In another example, the server activity system 108 can receive client activity data indicating how users interacted with resources that are generated and/or stored at client systems.

In addition, in various embodiments, the server activity system 108 receives the client activity data at various times. For example, in some embodiments, the server activity system 108 receives the client activity data from the client activity system 112 on a periodic basis. In other embodiments, the server activity system 108 receives the client activity data from the client activity system 112 on a continuous basis as the client activity system 112 generates the client activity data.

After the server activity system 108 receives the client activity data, the server activity system 108 adds the client activity data to the activity database 118 (408). The server activity system 108 adds the client activity data received from the client activity system 112 to the activity database 118 such that at least some of the client activity data remains associated with the user 116. In other words, the server activity system 108 does not make all of the client activity data anonymous. In some embodiments, when the server activity system 108 adds the client activity data to the activity database 118, the server activity system 108 correlates the client activity data with other client activity data and/or server activity data regarding the same resource. For example, the client activity data may indicate that the user 116 read a given blog post. In this example, the server activity system 108 can correlate this client activity data with other client activity data and/or server activity data that describes interactions between users and the given blog post.

Figure 5:
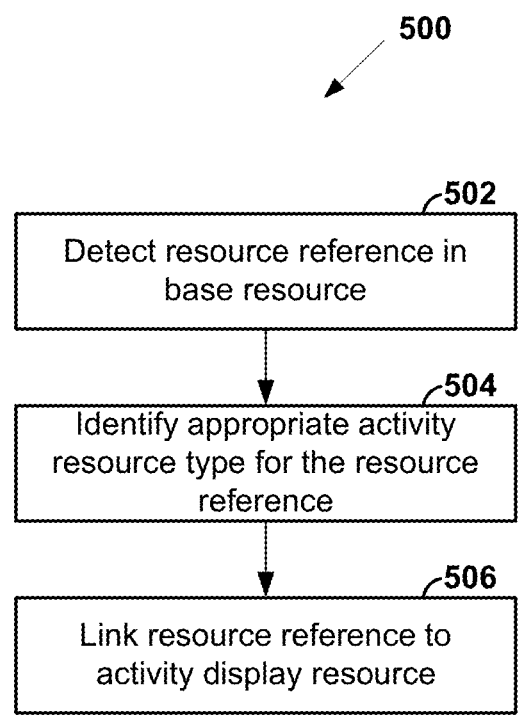
FIG. 5 is a flowchart illustrating an example operation to link resource references in a base resource to activity-based resources.

FIG. 5 is a flowchart illustrating an example operation 500 to link resource references in a base resource to activity-based resources. For ease of explanation, the steps of the operation 500 are described as being performed by the resource server 110. However, it should be appreciated that in various embodiments, various components of the system 100 perform the operation 500. For example, in some embodiments, the resource server 110 performs the operation 500. In other embodiments, the client application 114 performs the operation 500. In yet other embodiments, another computing system performs the operation 500.

In various embodiments, components of the system 100 perform the operation 500 at various times. For example, the resource server 110 can perform the operation 500 when the resource server 110 receives a resource request that requests the base resource. In another example, the resource server 110 can perform the operation 500 when the base resource is stored at or indexed at the server system 102. In yet another example, the client application 114 can perform the operation 500 during a process of generating a graphical user interface. In yet another example, the client application 114 can perform the operation 500 after the client application 114 receives resource data representing the base resource from the resource server 110 or another resource server.

Initially, the resource server 110 detects a resource reference in the base resource (502). The resource reference refers to a target resource. The base resource can be a wide variety of different types of resources. For example, the requested resource can be a search result interface containing links to resources that satisfy a search query. In this example, the target resource is one of the resources that satisfy the search query. In another example, the base resource can be a web page containing a list of people. In yet another example, the base resource can be a web page containing a mailbox interface that allows a user to view email messages. In yet another example, the base resource can be an email message. In yet another example, the base resource can be a word processor document. In yet another example, the base resource can be a spreadsheet document.

In various embodiments, the resource server 110 detects a resource reference in the base resource in various ways. For example, in some embodiments, a Hypertext Markup Language (HTML) document represents the base resource. In this example, the resource server 110 scans through the HTML document, looking for hyperlinks. In this example, the resource server 110 detects a resource reference when the resource server 110 finds a hyperlink that refers to a resource for which the activity database 118 stores activity data. In another example, an email message is the base resource. In this example, the resource server 110 scans the email message and detects a resource reference when the activity database 118 stores activity relating to the sender or the recipients of the email message. In yet another example, a text document is the base resource. In this example, the resource server 110 scans phrases in text document and detects a resource reference when a phrase in the text document refers to resources for which the activity database 118 stores activity data.

When the resource server 110 detects a resource reference in the requested resource, the resource server 110 identifies an appropriate activity-based resource type for the resource reference from among a plurality of activity-based resource types (504). The resource server 110 identifies the appropriate activity-based resource type for the resource reference based, at least in part, on the type of the requested resource and the type of the target resource.

In various embodiments, the resource server 110 identifies the appropriate activity-based resource type for the resource reference in various ways. For example, in some embodiments, the resource server 110 uses a set of rules to identify the appropriate resource type for the resource reference from among the plurality of activity-based resource types. Each rule in the set of rules specifies a mapping between a base resource-target resource combination and an activity-based resource type. A base resource-target resource combination is a combination of a base resource type and a target resource type. For example, an email message is the base resource and a word processor document is the target resource. In this example, a rule maps this base resource-target resource combination to a type of activity-based resource that displays information about an author of the word processor document and how the author interacted with the word processor document. In another example, a graphical user interface containing email message descriptors is the base resource and an email message is the target resource. In this example, a rule can map this base resource-target resource combination to a type of activity-based resource that displays information about whether recipients of the email message have read the email message. In yet another example, a search result web page is the base resource and a web page is the target resource. In this example, a rule can map this base resource-target resource combination to a type of activity-based resource that displays information indicating how individual users interacted with the web page and how those individual users are related to a user who requested the search result web page. In various embodiments, the set of rules is stored in various ways. For example, in some embodiments, the set of rules is stored in the resource server 110. In some embodiments, the set of rules is user configurable.

In other embodiments, the base resource contains metadata indicating the appropriate types of activity-based resources for different types of target resources. In yet other embodiments, the resource server 110 comprises software code that programmatically associates various base resource-target resource combinations with various types of activity-based resources. In such embodiments, the resource server 110 can operate in a manner similar to the rule-based embodiments described above, except that the rules are hardcoded into the resource server 110.

After identifying the appropriate activity-based resource type for the resource reference, the resource server 110 links the resource reference to an activity-based resource (506). The activity-based resource belongs to the appropriate activity-based resource type for the resource reference.

In various embodiments, the resource server 110 links the resource reference to the activity-based resource in various ways. For example, in some embodiments, the resource server 110 links the resource reference to the activity-based resource by modifying resource data representing the base resource such that the client application 114 sends a resource request for the activity-based resource whenever a user positions a cursor over the resource reference. In this example, the resource request can comprise a URL that indicates the appropriate activity-based resource type. In addition, the URL can identify the type of the base resource, the type of the target resource, and the user 116. In another example, in some embodiments, the resource server 110 modifies the resource data representing the base resource to incorporate resource data representing the activity-based resource. In this example, the resource server 110 also modifies the resource data representing the base resource to include a script, such as a Javascript script, that causes the client application 114 to show the activity-based resource when the user 116 positions a cursor over the resource reference or otherwise interacts with the resource reference.

Figure 6:
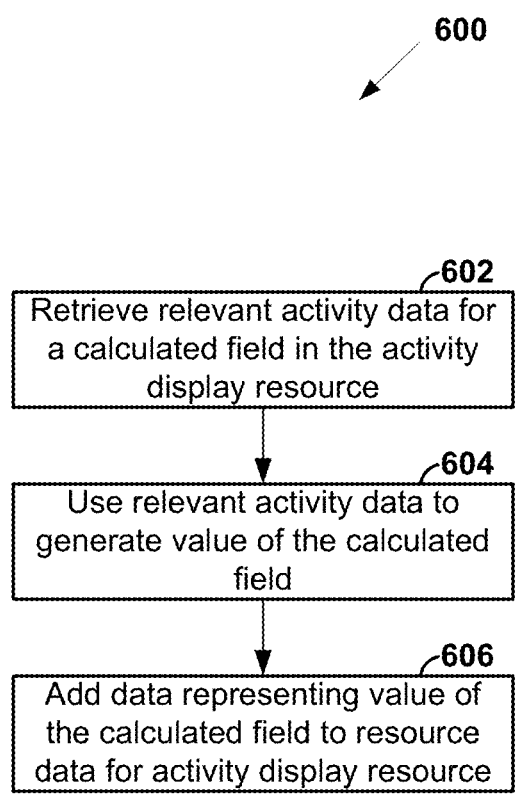
FIG. 6 is a flowchart illustrating an example operation performed by the server system to generate resource data based on activity data.

FIG. 6 is a flowchart illustrating an example operation 600 performed by the server system 102 to generate resource data representing an activity-based resource.

Various computing system can perform the operation 600 at various times. For example, in some embodiments, the resource server 110 receives a resource request from the client application 114 for the activity-based resource. In this example, the resource server 110 performs the operation 600 as part of a process to generate resource data representing the activity-based resource. In another example, the resource server 110 receives a resource request from the client application 114 for a base resource. In this example, the resource server 110 performs the operation 600 as part of a process to generate resource data representing the base resource. In this example, the resource server 110 incorporates the resource data representing the activity-based resource in the resource data representing the base resource. In yet another example, the client application 114 performs the operation 600 as part of a process to generate a graphical user interface.

An activity-based resource comprises a set of fixed fields and a set of calculated fields. Each activity-based resource belonging to a given activity-based resource type has the same set of fixed fields and the same set of calculated fields. Each activity-based resource belonging to a given activity-based resource type has the same values in their fixed fields. For example, each activity-based resource belonging to a given activity-based resource type can include the same title. Different activity-based resources belonging to a given activity-based resource type can have different values in their calculated fields.

The values of some calculated fields indicate how one or more users interacted with one or more resources. For example, an activity-based resource can comprise a calculated field that contains the names of the users who have edited a particular document. In another example, an activity-based resource can comprise a calculated field that indicates how many times a particular user has edited a particular resource. In yet another example, an activity-based resource can comprise a calculated field that lists users who have copied information out of a particular resource. In yet another example, an activity-based resource can comprise one or more calculated fields that provide information about resources other than the base resource or the target resource of a resource reference. For instance, an activity-based resource can comprise a calculated field that indicates a list of documents authored by a user who read the target reference.

The following steps of the operation 600 are described as being performed by the resource server 110. However, it should be appreciated that in some embodiments other components of the system 100, such as the client application 114, can perform the steps of the operation 600. To generate resource data representing an activity-based resource, the resource server 110 performs the operation 600 with regard to each calculated field in the activity-based resource that indicates how users interacted with resources. Initially, the resource server 110 retrieves relevant activity data for a calculated field (602). The relevant activity data for a calculated field is the subset of the activity data stored in the activity database 118 that is relevant to the calculation of a value of the calculated field.

In various embodiments, the resource server 110 performs various actions to retrieve the relevant activity data for the calculated field. For example, in some embodiments, the resource server 110 interprets a script associated with the activity-based resource when the resource server 110 receives a resource request for the activity-based resource. The script indicates to the resource server 110 how to query the activity database 118 for the relevant resource data. In this example, the server activity system 108 processes search queries from the resource server 110 and returns the relevant activity data for the calculated field in response to the one or more search queries. In another example, the resource server 110 retrieves a template document associated with the activity-based resource. The template document contains data that indicate how to retrieve the relevant activity data for the calculated field.

After retrieving at least some of the relevant activity data for the calculated field, the resource server 110 uses the relevant activity data for the calculated field to generate the value of the calculated field (604). The resource server 110 can perform various activities to generate the values for the calculated field. For example, the resource server 110 can generate the value of the calculated field by counting the number of times the relevant activity data indicates that a particular user accessed a particular resource. In another example, the calculated field indicates a last time a particular user edited a particular resource. In this example, the resource server 110 generates the value of the calculated field by scanning through the relevant activity data to identify the last time the particular user edited the target resource. In yet another example, the calculated field indicates an average length of time that a particular user spent reading a particular document. In this example, the resource server 110 generates the value of the calculated field by using the relevant activity data to identify lengths of time that the particular user spent reading the particular document, summing these lengths of time, and then dividing the sum by a number of times that the particular user read the particular resource.

In some embodiments, the value of the calculated field is dependent on how the user 116 is related to other users in a population. Consequently, the value of the calculated field can be different for different users in the population. For example, the base resource comprises a search results interface and the target resource is a resource that satisfies a search query. In this example, the resource server 110 generates the value of the calculated field such that value of the calculated field indicates how one or more peers of the user 116 interacted with the target resource. A first user is a peer of a second user when the first user and the second user directly report to the same person. In another example, the value of the calculated field indicates users that have read the target resource and that are connected to the user 116 through social networking links. In yet another example, the population includes a set of experts with regard to a particular topic discussed in the target resource. In this example, the value of the calculated field is dependent on how one or more of the experts interacted with the target resource.

The resource server 110 then adds data representing the value of the calculated field to resource data representing the activity-based resource (606). In various embodiments, the resource server 110 adds the data representing the value of the calculated field to the resource data representing the activity-based resource in various ways. For example, in some embodiments, the resource data representing the activity-based resource is an Extensible Markup Language (XML) document. In this example, the resource server 110 adds data representing the value of the calculated field by adding an XML element to the XML document. The XML element specifies the value of the calculated field. Alternately, the resource server 110 adds data representing the value of the calculated field by inserting the value of the calculated field into one or more existing XML elements in the XML document. In another example, the resource data is an HTML document. In this example, the resource server 110 adds data representing the value of the calculated field by adding one or more HTML elements to the HTML document or by inserting the value of the calculated field into one or more existing HTML element in the HTML document.

After adding data representing the value of the calculated field to the resource data representing the activity-based resource, the resource server 110 can repeat the steps 602, 604, and 606 with regard to another calculated field in the activity-based resource. The resource server 110 continues repeating the steps 602, 604, and 606 with regard to different calculated fields in the activity-based resource until the resource data represents a completed version of the activity-based resource.

Figure 7:
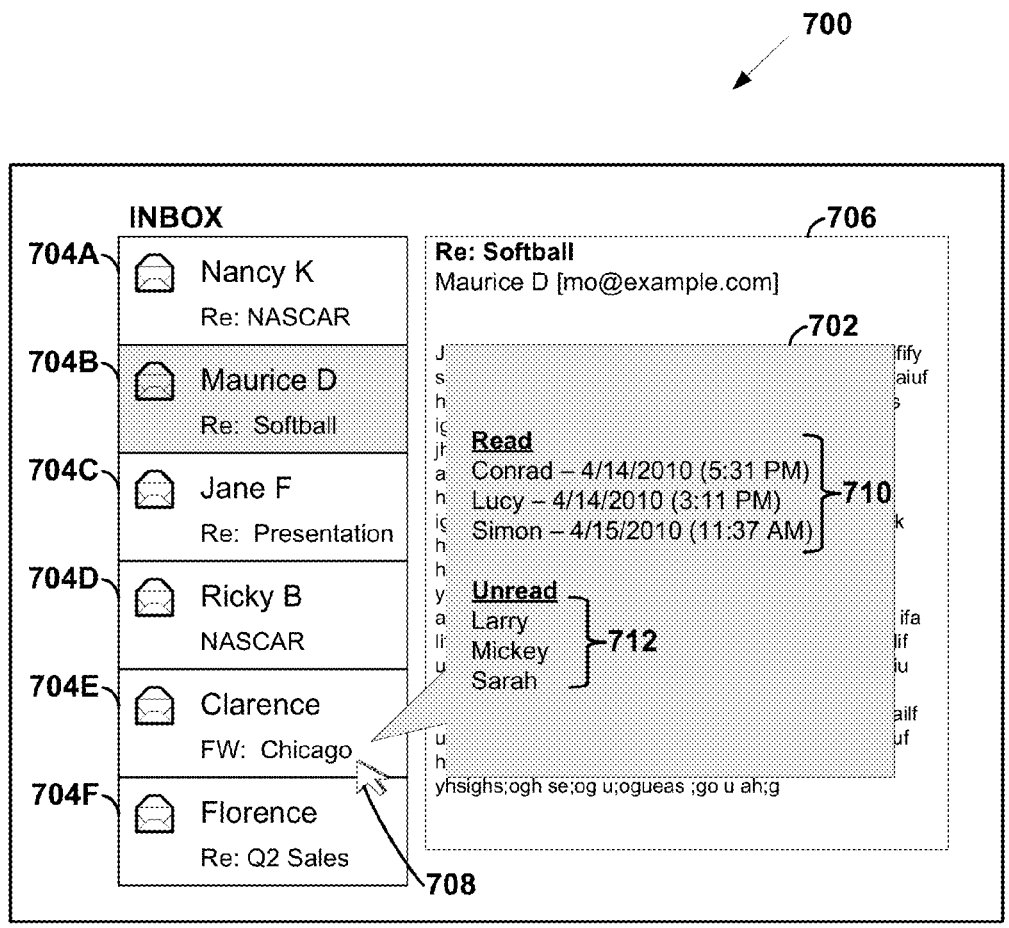
FIG. 7 is an example mailbox interface containing an activity-based resource.

FIG. 7 is an example mailbox interface 700 containing an activity-based resource 702. The client application 114 displays the mailbox interface 700 to the user 116. The mailbox interface 700 is a graphical user interface that enables the user 116 to view email messages.

As illustrated in the example of FIG. 7, the mailbox interface 700 contains email message descriptors 704A-704F (collectively, "email messages descriptors 704"). Each of the email message descriptors 704 describes a different email message. Each of the email message descriptors 704 is a resource reference. The mailbox interface 700 also contains a preview pane 706. The preview pane 706 displays a selected email message. In the example of FIG. 6, the email message described by the email descriptor 704B is selected. Consequently, the preview pane 706 displays the email message described by the email message descriptor 704B.

Furthermore, the user 116 has positioned a cursor 708 over the email message descriptor 704E. When the user 116 positioned the cursor 708 over an email message descriptor, the client application 114 displayed the activity-based resource 702 to the user 116. In some embodiments, the client application 114 can hide the activity-based resource 702 when the user 116 moves the cursor 708 off the email message descriptor 704E.

In the example of FIG. 7, the client application 114 displays the activity-based resource 702 on top of the mailbox interface 700 (i.e., the base resource). In other embodiments, the client application 114 can display activity-based resources in other ways. For example, in some embodiments, the client application 114 can display an activity-based resource in a panel next to the base resource, such that both the activity-based resource and the base resource are concurrently visible. In another example, in some embodiments, the client application 114 can display the activity-based resource in a different window than the base resource.

As illustrated in the example of FIG. 7, the activity-based resource 702 comprises a read field 710 and an unread field 712. The read field 710 and the unread field 712 are calculated fields of the activity-based resource. The value of the read field 710 lists users who have read the email message described by the email message descriptor 704E. The value of the read field 710 also lists the dates and times when these users read the email message described by the email message descriptor 704E. The value of the unread field 712 lists users who have received the email message described by the email message descriptor 704E, but who have not yet read this email message.

Figure 8:
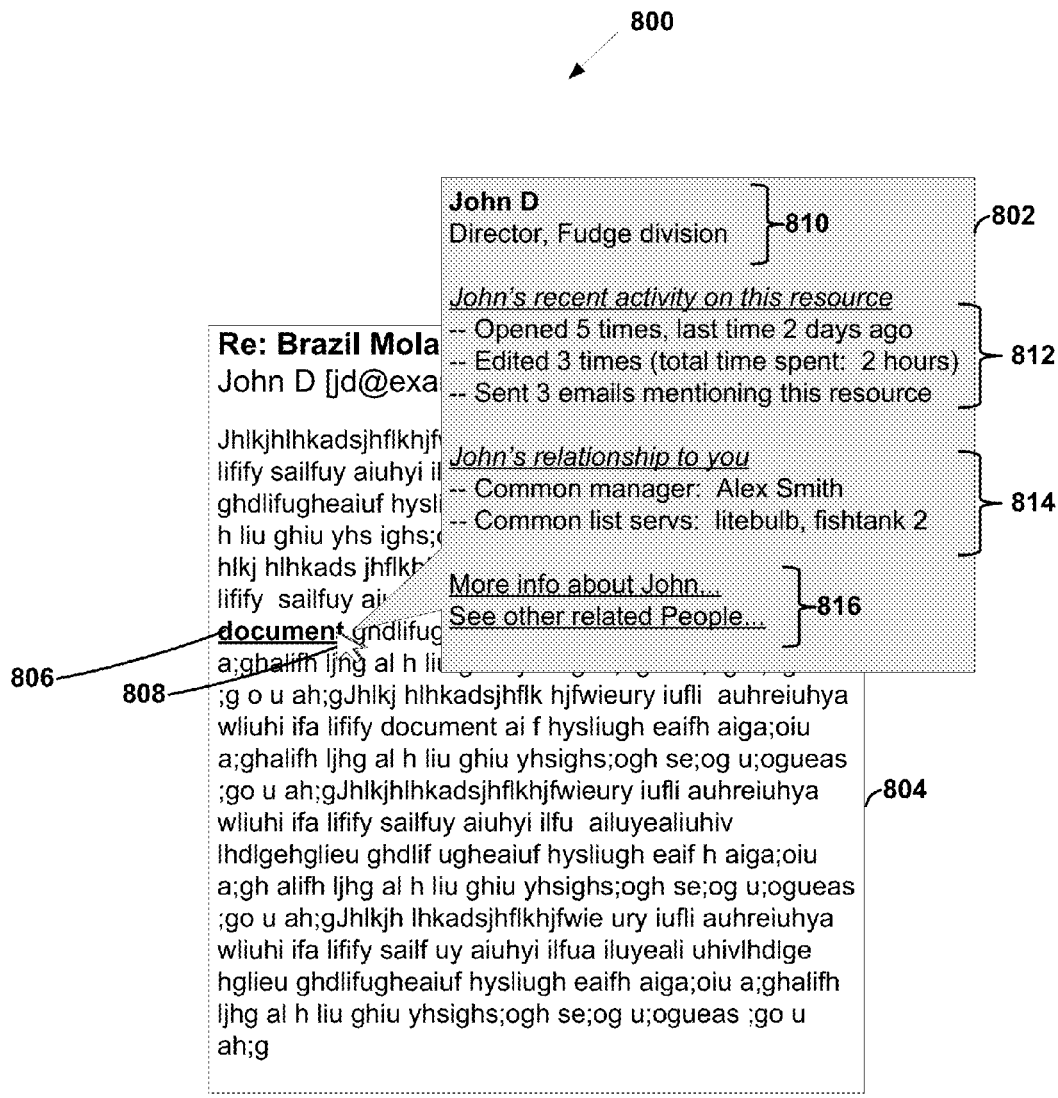
FIG. 8 is another example user interface containing an activity-based resource.

FIG. 8 is another example user interface 800 containing an activity-based resource 802. The client application 114 displays the user interface 800 to the user 116. As illustrated in the example of FIG. 8, the user interface 800 contains an email message 804 from a user "John D." The email message 804 comprises a hyperlink 806. The hyperlink 806 is a resource reference.

When the user 116 positions a cursor 808 over the hyperlink 806, the client application 114 presents the activity-based resource 802 to the user 116 in the user interface 800. As illustrated in the example of FIG. 8, the activity-based resource 802 comprises a label field 810. The label field 810 indicates that the activity-based resource 802 contains information about the user "John D" and contains a job title of the user "John D." In the example of FIG. 8, the activity-based resource 802 can contain information about the user "John D" for various reasons. For example, the activity-based resource 802 can contain information about the user "John D" because the hyperlink 806 refers to a document authored by the user "John D." The values in the label field 810 are not necessarily generated using activity data stored in the activity database 118.

The activity-based resource 802 also comprises a set of fields 812 related to the recent activity of the user "John D" regarding the document referred to by the hyperlink 806. The fields in the set of fields 812 are calculated fields. The set of fields 812 includes a field indicating the number of times that the user "John D" has opened the document referred to by the hyperlink 806, a field indicating a number of times that the user "John D" has edited the document referred to by the hyperlink 806, and a number of emails sent by the user "John D" mentioning the document referred to by the hyperlink 806.

The activity-based resource 802 also comprises a set of fields 814 related to how the user "John D" is related to the user 116. The set of fields 814 includes a field indicating a common manager of the user "John D" and the user 116. The set of fields 814 also includes a field indicating the number of email distribution lists that include both the user "John D" and the user 116.

Furthermore, the activity-based resource 802 also comprises links 816 to further information. As illustrated in the example of FIG. 8, the links 816 include a link to "more info about John" and a link to "see other related people."

Figure 9:
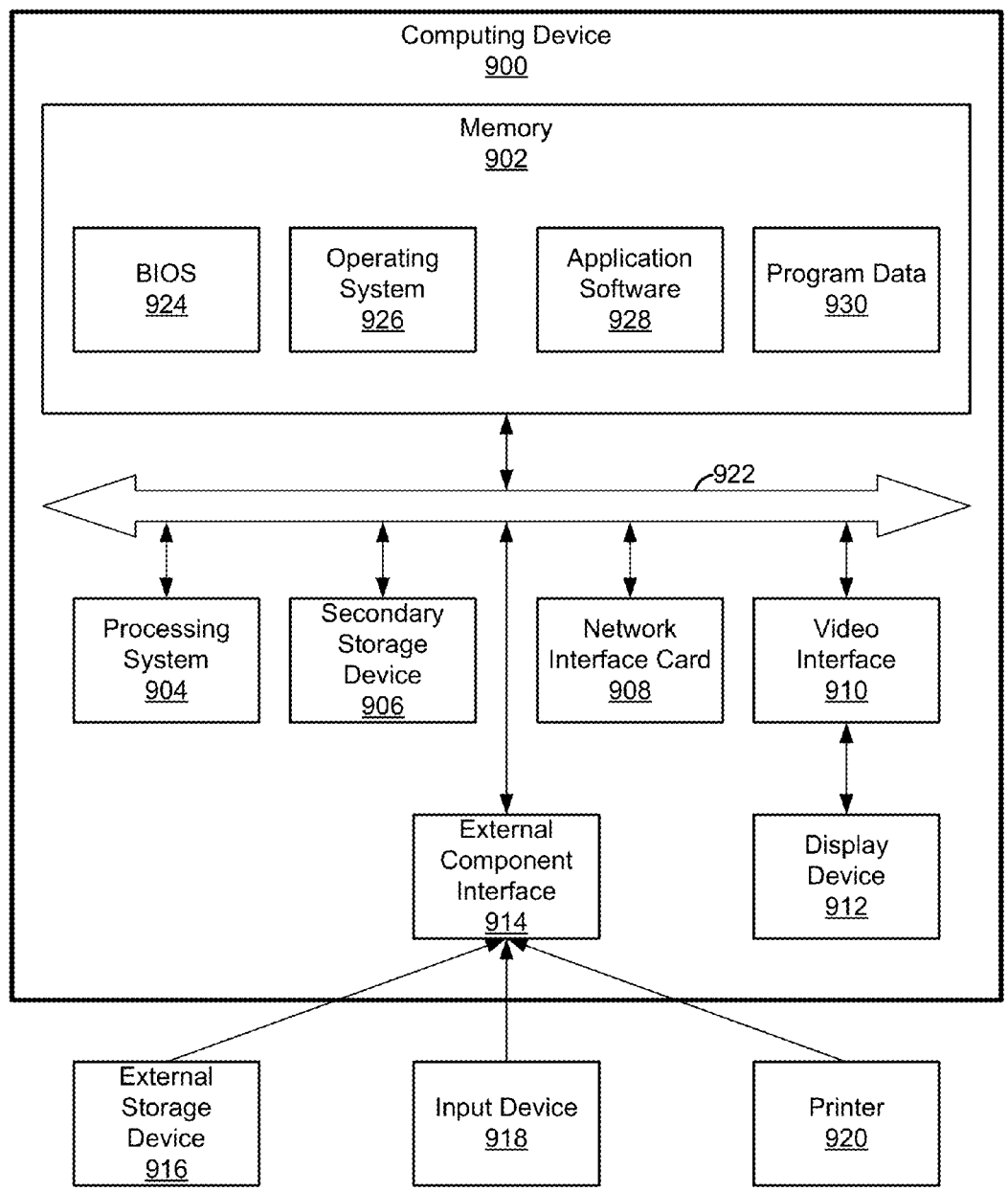
FIG. 9 is a block diagram illustrating an example computing device.

FIG. 9 is a block diagram illustrating an example computing device 900. In some embodiments, the server system 102 and/or the client system 104 are implemented using one or more computing devices like the computing device 900. It should be appreciated that in other embodiments, the server system 102 and/or the client system 104 are implemented using computing devices having hardware components other than those illustrated in the example of FIG. 9.

In different embodiments, computing devices are implemented in different ways. For instance, in the example of FIG. 9, the computing device 900 comprises a memory 902, a processing system 904, a secondary storage device 906, a network interface card 908, a video interface 910, a display device 912, an external component interface 914, an external storage device 916, an input device 918, a printer 920, and a communication medium 922. In other embodiments, computing devices are implemented using more or fewer hardware components. For instance, in another example embodiment, a computing device does not include a video interface, a display device, an external storage device, or an input device.

The memory 902 includes one or more computer-readable data storage media capable of storing data and/or instructions. As used in this document, a computer-readable data storage medium is a device or article of manufacture that stores data and/or software instructions readable by a computing device. In different embodiments, the memory 902 is implemented in different ways. For instance, in various embodiments, the memory 902 is implemented using various types of computer-readable data storage media. Example types of computer-readable data storage media include, but are not limited to, dynamic random access memory (DRAM), double data rate synchronous dynamic random access memory (DDR SDRAM), reduced latency DRAM, DDR2 SDRAM, DDR3 SDRAM, Rambus RAM, solid state memory, flash memory, read-only memory (ROM), electrically-erasable programmable ROM, and other types of devices and/or articles of manufacture that store data.

The processing system 904 includes one or more physical integrated circuits that selectively execute software instructions. In various embodiments, the processing system 904 is implemented in various ways. For instance, in one example embodiment, the processing system 904 is implemented as one or more processing cores. For instance, in this example embodiment, the processing system 904 may be implemented as one or more Intel Core 2 microprocessors. In another example embodiment, the processing system 904 is implemented as one or more separate microprocessors. In yet another example embodiment, the processing system 904 is implemented as an ASIC that provides specific functionality. In yet another example embodiment, the processing system 904 provides specific functionality by using an ASIC and by executing software instructions.

In different embodiments, the processing system 904 executes software instructions in different instruction sets. For instance, in various embodiments, the processing system 904 executes software instructions in instruction sets such as the x86 instruction set, the POWER instruction set, a RISC instruction set, the SPARC instruction set, the IA-64 instruction set, the MIPS instruction set, and/or other instruction sets.

The secondary storage device 906 includes one or more computer-readable data storage media. The secondary storage device 906 stores data and software instructions not directly accessible by the processing system 904. In other words, the processing system 904 performs an I/O operation to retrieve data and/or software instructions from the secondary storage device 906. In various embodiments, the secondary storage device 906 is implemented by various types of computer-readable data storage media. For instance, the secondary storage device 906 may be implemented by one or more magnetic disks, magnetic tape drives, CD-ROM discs, DVD-ROM discs, Blu-Ray discs, solid state memory devices, Bernoulli cartridges, and/or other types of computer-readable data storage media.

The network interface card 908 enables the computing device 900 to send data to and receive data from a computer communication network. In different embodiments, the network interface card 908 is implemented in different ways. For example, in various embodiments, the network interface card 908 is implemented as an Ethernet interface, a token-ring network interface, a fiber optic network interface, a wireless network interface (e.g., WiFi, WiMax, etc.), or another type of network interface.

The video interface 910 enables the computing device 900 to output video information to the display device 912. In different embodiments, the video interface 910 is implemented in different ways. For instance, in one example embodiment, the video interface 910 is integrated into a motherboard of the computing device 900. In another example embodiment, the video interface 910 is a video expansion card. Example types of video expansion cards include Radeon graphics cards manufactured by Advanced Micro Devices, Inc. of Sunnyvale, Calif., Geforce graphics cards manufactured by Nvidia Corporation of Santa Clara, Calif., and other types of graphics cards.

In various embodiments, the display device 912 is implemented as various types of display devices. Example types of display devices include, but are not limited to, cathode-ray tube displays, LCD display panels, plasma screen display panels, touch-sensitive display panels, LED screens, projectors, and other types of display devices. In various embodiments, the video interface 910 communicates with the display device 912 in various ways. For instance, in various embodiments, the video interface 910 communicates with the display device 912 via a Universal Serial Bus (USB) connector, a VGA connector, a digital visual interface (DVI) connector, an S-Video connector, a High-Definition Multimedia Interface (HDMI) interface, a DisplayPort connector, or other types of connectors.

The external component interface 914 enables the computing device 900 to communicate with external devices. In various embodiments, the external component interface 914 is implemented in different ways. For instance, in one example embodiment, the external component interface 914 is a USB interface. In other example embodiments, the computing device 900 is a FireWire interface, a serial port interface, a parallel port interface, a PS/2 interface, and/or another type of interface that enables the computing device 900 to communicate with external components.

In different embodiments, the external component interface 914 enables the computing device 900 to communicate with different external components. For instance, in the example of FIG. 9, the external component interface 914 enables the computing device 900 to communicate with the external storage device 916, the input device 918, and the printer 920. In other embodiments, the external component interface 914 enables the computing device 900 to communicate with more or fewer external components. Other example types of external components include, but are not limited to, speakers, phone charging jacks, modems, media player docks, other computing devices, scanners, digital cameras, a fingerprint reader, and other devices that can be connected to the computing device 900.

The external storage device 916 is an external component comprising one or more computer readable data storage media. Different implementations of the computing device 900 interface with different types of external storage devices. Example types of external storage devices include, but are not limited to, magnetic tape drives, flash memory modules, magnetic disk drives, optical disc drives, flash memory units, zip disk drives, optical jukeboxes, and other types of devices comprising one or more computer-readable data storage media. The input device 918 is an external component that provides user input to the computing device 900. Different implementations of the computing device 900 interface with different types of input devices. Example types of input devices include, but are not limited to, keyboards, mice, trackballs, stylus input devices, key pads, microphones, joysticks, touch-sensitive display screens, and other types of devices that provide user input to the computing device 900. The printer 920 is an external device that prints data to paper. Different implementations of the computing device 900 interface with different types of printers. Example types of printers include, but are not limited to laser printers, ink jet printers, photo printers, copy machines, fax machines, receipt printers, dot matrix printers, or other types of devices that print data to paper.

The communications medium 922 facilitates communication among the hardware components of the computing device 900. In different embodiments, the communications medium 922 facilitates communication among different components of the computing device 900. For instance, in the example of FIG. 9, the communications medium 922 facilitates communication among the memory 902, the processing system 904, the secondary storage device 906, the network interface card 908, the video interface 910, and the external component interface 914. In different implementations of the computing device 900, the communications medium 922 is implemented in different ways. For instance, in different implementations of the computing device 900, the communications medium 922 may be implemented as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 902 stores various types of data and/or software instructions. For instance, in the example of FIG. 9, the memory 902 stores a Basic Input/Output System (BIOS) 924, an operating system 926, application software 928, and program data 930. The BIOS 924 includes a set of software instructions that, when executed by the processing system 904, cause the computing device 900 to boot up. The operating system 926 includes a set of software instructions that, when executed by the processing system 904, cause the computing device 900 to provide an operating system that coordinates the activities and sharing of resources of the computing device 900. Example types of operating systems include, but are not limited to, Microsoft Windows®, Linux, Unix, Apple OS X, Apple OS X iPhone, Palm webOS, Palm OS, Google Chrome OS, Google Android OS, and so on. The application software 928 includes a set of software instructions that, when executed by the processing system 904, cause the computing device 900 to provide applications to a user of the computing device 900. The program data 930 is data generated and/or used by the application software 928.

The various embodiments described above are provided by way of illustration only and should not be construed as limiting. Those skilled in the art will readily recognize various modifications and changes that may be made without following the example embodiments and applications illustrated and described herein. For example, the operations shown in the figures are merely examples. In various embodiments, similar operations can include more or fewer steps than those shown in the figures. Furthermore, in other embodiments, similar operations can include the steps of the operations shown in the figures in different orders.

We claim:

1. A method comprising:
    displaying a base resource within a client application, wherein the base resource is a document or email message associated with the client application;
    detecting, by a computing system, a resource reference in the base resource, the resource reference referring to a target resource;
    after detecting the resource reference, identifying, by the computing system, an appropriate activity-based resource type that indicates how a user interacted with the target resource;
    after identifying the appropriate activity-based resource type, linking, by the computing system, the resource reference to the activity-based resources;
    receiving an interaction with the resource reference; and
    displaying the activity based resource within the client application, the activity based resource including user information and information relating to how the user interacted with the target resource.

2. The method of claim 1, wherein detecting the resource reference in the base resource comprises: detecting a hyperlink in the base resource.

3. The method of claim 1, wherein identifying the appropriate activity-based resource type comprises: using a set of rules to identify the appropriate activity-based resource type from among a plurality of activity-based resource types, the rules mapping base resource-target resource combinations to activity-based resource types in the plurality of activity-based resource types.

4. The method of claim 1, wherein the method further comprises: generating resource data representing the activity-based resource.

5. The method of claim 4, wherein generating the resource data representing the activity-based resource comprises:
    retrieving relevant activity data from an activity database that stores the activity data;
    using the relevant activity data to generate a value of a calculated field in the activity-based resource; and
    adding data representing the value of the calculated field to the resource data representing the activity-based resource.

6. The method of claim 5,
    wherein retrieving the relevant activity data comprises: querying the activity database for the resource data that indicate how the one or more users have interacted with the target resource; and
    wherein adding data representing the value of the calculated field comprises inserting an XML element into the resource data representing the activity-based resource, the XML element specifying the value of the calculated field.

7. The method of claim 1, further comprising: displaying the activity-based resource when the user positions a cursor over the resource reference.

8. The method of claim 7, further comprising:
    displaying the target resource when the user selects the resource reference; and
    hiding the activity-based resource when the user moves the cursor off the resource reference.

9. The method of claim 1, further comprising: performing the following actions prior to detecting the resource reference:

sending, by the computing system, a resource request to a resource server via a network, the resource request requesting the base resource; and
receiving, by the computing system, resource data representing the base resource.

10. A computing system comprising:
    a processing system comprising one or more processing units; and
    a data storage system that stores computer-readable instructions that, when executed by one or more of the processing units, cause the computing system to:
        displaying a base resource within a client application, wherein the base resource is a document or email message associated with the client application;
        detect a resource reference in the base resource, the resource reference referring to a target resource;
        identify an appropriate activity-based resource type for the resource reference based at least in part on a type of the target resource, wherein an activity-based resource of the appropriate activity-based resource type indicates types of user activities for a user to interact with the target resource;
        link the resource reference to the activity-based resources;
        receiving an interaction with the resource reference; and
        displaying the activity based resource within the client application, the activity based resource including user information and information relating to how the user interacted with the target resource.

11. The computing system of claim 10, wherein the computer-readable instructions, when executed by one or more of the processing units, cause the computing system to generate resource data representing the activity-based resource.

12. The computing system of claim 11, wherein the computer-readable instructions, when executed by one or more of the processing units, cause the computing system to perform the following actions as part of an operation to generate the resource data representing the activity-based resource:
    retrieve relevant activity data from an activity database that stores the activity data;
    use the relevant activity data to generate the value of the calculated field; and
    add data representing the value of the calculated field to the resource data representing the activity-based resource.

13. The computing system of claim 11,
    wherein the computer-readable instructions, when executed by one or more of the processing units, cause the computing system to provide a resource server that generates the resource data representing the activity-based resource in response to receiving a resource request from a client application, the resource request requesting the activity-based resource; and
    wherein the computer-readable instructions, when executed by one or more of the processing units, cause the computing system to link the resource reference to the activity-based resource such that when the user interacts with the resource reference, the client application sends the resource request to the resource server.

14. The computing system of claim 11,
    wherein the computer-readable instructions, when executed by one or more of the processing units, cause the computing system to provide a resource server that performs the following actions in response to receiving from a client application a resource request requesting the base resource:
  generate the resource data representing the activity-based resource; and
  incorporate the resource data representing the activity-based resource into resource data representing the base resource; and
wherein the computer-readable instructions, when executed by one or more of the processing units, cause the computing system to link the resource reference to the activity-based resource such that when the user interacts with the resource reference, the client application uses the resource data representing the activity-based resource to display the activity-based resource.

15. The computing system of claim 10, wherein the computer-readable instructions, when executed by one or more of the processing units, cause the computing system to perform one of the following actions: display the activity-based resource on top of the base resource, and display the activity-based resource in a panel next to the base resource.

16. The computing system of claim 10, wherein the computer-readable instructions, when executed by one or more of the processing units, cause the computing system to:
  generate client activity data without receiving the client activity data from the user, the client activity data indicating how the user interacted with a given resource presented to the user; and
  send the client activity data to a server activity system that adds the client activity data to the activity data, the client activity data remaining associated with the user.

17. The computing system of claim 10, wherein the computer-readable instructions, when executed by one or more of the processing units, cause the computing system to:
  generate server activity data that indicates how the one or more users interacted with the target resource hosted by a resource server; and
  add the server activity data to the activity data such that the server activity data remains associated with the users.

18. The computing system of claim 10, wherein the base resource comprises a search results interface and the target resource is a resource that satisfies a search query, wherein the value of the calculated field indicates how a peer of the user interacted with the target resource.

19. A computing system comprising:
  a processing system comprising one or more processing units; and
  a data storage system that stores computer-readable instructions that, when executed by one or more of the processing units, cause the computing system to:
    displaying an email message within an email client application;
    detect a resource reference in the email message, the resource reference being a hyperlink to a target resource;
    identify an appropriate activity-based resource for the resource reference based at least in part on a type of the target resource, wherein an activity-based resource of the appropriate activity-based resource indicates types of user activities for a user to interact with the target resource;
    link the resource reference to the activity-based resource;
    receiving an interaction with the resource reference; and
    displaying the activity based resource within the client application, the activity based resource including user information and information relating to how the user interacted with the target resource.

20. The computing system of claim 19, wherein the activity based resource is displayed in a popup with the email message.

* * * * *